United States Patent [19]

Craun et al.

[11] Patent Number: 5,576,360
[45] Date of Patent: *Nov. 19, 1996

[54] LOW VOC, AQUEOUS DISPERSED, EPOXY CROSSLINKED POLYESTER ACRYLIC COATINGS

[75] Inventors: Gary P. Craun, Berea; Victor V. Kaminski, Seven Hills, both of Ohio

[73] Assignee: The Glidden Company, Cleveland, Ohio

[ * ] Notice: The term of this patent shall not extend beyond the expiration date of Pat. No. 5,464,885.

[21] Appl. No.: 274,804

[22] Filed: Jul. 14, 1994

[51] Int. Cl.$^6$ ............... C08K 3/20; C08L 63/02
[52] U.S. Cl. ............ 523/407; 523/406; 523/408; 523/409; 523/501
[58] Field of Search ............... 523/407, 409, 523/412, 406, 408, 501; 525/170

[56] References Cited

U.S. PATENT DOCUMENTS 4,897,434  1/1990  Shimada et al. ............... 523/409

Primary Examiner—Melvyn I. Marquis
Assistant Examiner—D. Aylward
Attorney, Agent, or Firm—Thomas M. Schmitz

[57] ABSTRACT

A coating composition substantially free of volatile organic compounds and containing a film-forming polymeric binder comprising epoxy crosslinked microgel particles having a particle size less than about 0.15 microns. The microgel particles are produced by first dispersing carboxyl functional addition copolymer dispersant into water followed by dispersing carboxyl functional polyester oligomer and diepoxide resin into the aqueous dispersant, and then esterifying the epoxy resin with the carboxyl functionality on the copolymer and oligomer. In a further variation, the polyester oligomer can contain maleic or fumaric unsaturation and subsequently grafted with in-situ copolymerized ethylenic monomers.

23 Claims, No Drawings

LOW VOC, AQUEOUS DISPERSED, EPOXY CROSSLINKED POLYESTER ACRYLIC COATINGS

This invention pertains to protective coatings containing zero or very low levels of volatile organic compounds (VOC), and more particularly to aqueous dispersed crosslinked microgel particles comprising carboxyl functional polyester dispersed in water with an acrylic dispersant and crosslinked with epoxy to form polymeric binders particularly useful for coating interior substrates of beer and beverage containers (cans).

BACKGROUND OF THE INVENTION

Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in surface coating materials as a vehicle or polymeric binder to advantageously provide toughness, flexibility, adhesion, and chemical resistance to the applied coating film. Hence, water-dispersed coating compositions containing epoxy resins are highly desirable for can coating compositions. Coatings for soft drink and beer cans, for instance, are critical due to taste sensitivity and must not alter the taste of canned beverages. Taste problems can occur in a variety of ways such as by leaching of coating components into the beverage, or by adsorption of flavor by the coating, or sometimes by chemical reaction, or by some combination thereof.

In commonly assigned U.S. Pat. No. 4,212,781, a process is disclosed for modifying epoxy resin by reacting the epoxy resin with addition polymerizable ethylenic monomer in the presence of at least 3% by weight of benzoyl peroxide (or the free radical initiating equivalent thereof) based on monomer at a suitable reaction temperature to produce a reaction mixture comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. Similarly, commonly assigned U.S. Pat. No. 4,522,961 pertains to a mixture of polymers comprising a self-curing emulsion polymer (latex), an epoxy-acrylic graft copolymer, and preferably a phosphate additive. Related commonly assigned patents are U.S. Pat. Nos. 4,285,847 and 4,399,241, and 5,212,241. Most prior art water-dispersed epoxy coatings utilize relatively high levels of organic solvent to assist processing of the epoxy resin. Although epoxy containing coatings have long been the standard of excellence in beverage can liners, such coatings cannot be prepared without significant amounts of solvent, where typically 50% to 100% volatile organic solvent is required based on solids (about 2.5 to 4 lb./gal.). Recent environmental concerns and legislative pressure have created the need for a zero or near zero VOC can coating. Furthermore, such coatings require environmentally undesirable external crosslinkers such as melamine/formaldehyde crosslinkers.

Polyesters containing copolymerized aromatic acid in the backbone provide good barrier films in beverage and food containers. Although carboxyl functional polyesters can be dispersed into water, low molecular weight polyesters having molecular weights below about 3,000 have limited colloidal stability as well as poor film properties, and hence, severely limit the potential of such coatings. Higher molecular weight polyesters exhibit better film properties but have very poor aqueous stability.

It now has been found that the use of small amounts of a low molecular weight, carboxyl functional addition copolymer as a polymeric dispersant substantially increases the aqueous stability of water dispersed polyester polymers and further enables emulsion crosslinking to produce low or zero VOC microgel particles having very high molecular weight but a particle size below about 0.15 micron. In accordance with this invention, very low or zero VOC polyester polymer particles having high molecular weight can be stably dispersed by using emulsion polymerization and by crosslinking the polyester with difunctional epoxy to produce crosslinked microgel particles. The final crosslinked particle size is controlled by composition, molecular weight, concentration, temperature, ionic strength and the relative amounts of polymeric dispersant, polyester, and microgel crosslinking. Particle size need not be controlled by mechanical shear and consequently is much easier to control and reproduce by maintaining reaction parameters constant. Multifunctional epoxy resin is added to the aqueous dispersion and reacted with carboxylic acid functionality to produce crosslinked microgel particles. The viscosity of the aqueous dispersion can be controlled by the amount of epoxy added, the composition and amount of acrylic dispersant, and the composition and amount of polyester. The resulting crosslinked microgel particles are typically less than about 0.15 microns and are stably dispersed in water without additional surfactants.

This invention incorporates the advantages of epoxy chemistry providing good barrier properties and excellent resistance to flavor absorption along with a synthesis technique that substantially reduces the level of organic solvents, organic amines and surfactants. The zero VOC aqueous coatings have extended storage stability along with controllable viscosity. Baked paint films utilizing the resulting polymeric binder are clear, glossy, solvent resistance, and water resistant. These and other advantages of this invention will become more apparent by referring to the detailed description of the invention and the illustrative examples.

SUMMARY OF THE INVENTION

Briefly, the zero or very low VOC protective coating compositions of this invention are substantially free of volatile organic compounds and surfactants and are based on an aqueous dispersed, film-forming, polymeric binder comprising aqueous dispersed microgel particles produced by dispersing low molecular weight carboxyl functional polyester into water with the assistance of a preformed low molecular weight carboxyl functional addition copolymer dispersant to form an aqueous mixture capable of dispersing difunctional epoxy resin into the aqueous dispersion. In accordance with this invention, the aqueous dispersed epoxy is esterified with the aqueous dispersed polyester and the carboxyl functional addition copolymer dispersant to form stably dispersed microgel particles having a particle size less than about 0.15 micron. On a weight basis, the resulting crosslinked microgel polymer particles comprise between 2% to 95% addition copolymer dispersant, 4% to 97% polyester with the balance being epoxy resin (1% to 50%).

DETAILED DESCRIPTION OF THE INVENTION

The aqueous dispersed crosslinked microgel particles are comprised of polyester polymer dispersed into water with the assistance of an addition copolymer dispersant and emulsion copolymerized and crosslinked with epoxy resin dispersed in the aqueous phase.

Referring first to the preformed addition polymer dispersant for dispersing polyester into water, the polymeric dispersant is a low molecular weight addition copolymer of copolymerized ethylenic unsaturated monomers including at least 5% by weight carboxyl monomer such as acrylic acid, methacrylic acid, ethacrylic acid and similar alkyl acrylic acids. The polymeric dispersant can be prepared from mixtures of olefinic monomers free-radically polymerized to form an addition copolymer with a molecular weight between 1,000 and 50,000 (Mn). The preferred molecular weight is a number average between 2,000 and 30,000. The olefinic monomer mixture must contain at least 5 wt% of carboxylic acid containing monomer to provide an addition copolymer having an Acid No. above 35 and preferably between 90 and 280. Preferred compositions contain between 10% and 50% by weight carboxyl monomer based on the total ethylenic monomers copolymerized. Useful polymerizable ethylenically unsaturated monomers contain carbon-to-carbon unsaturation and include vinyl monomers, acrylic monomers, allylic monomers, acrylamide monomers, as well as the mono- and carboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxy propyl acrylates and methacrylates, as well as amino acrylates and methacrylates. Useful ethylenic monomers further include N-alkylol amides including acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Minor amounts of functional monomers can be added, if desired, such as hydroxyl, amino, and amido functional groups containing monomers. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. Preferred monomers are low Tg hydrophilic monomers such as allyl acrylate.

Carboxyl functional monomers are particularly included, as previously indicated, and comprise acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid and similar acrylic acid and lower alkyl substituted acrylic acids. The preferred vinyl monomers are acrylic, methacrylic, or styrenic, monomers but particularly, ethylacrylate, butylacrylate, methylmethacrylate, and styrene. The preferred carboxylic-acid containing vinyl monomers are methacrylic acid, acrylic acid, itaconic acid, acrylic acids, or similar acrylic type acids. Less preferred fumaric or maleic dicarboxylic acids can be used if desired to provide carboxyl functionality.

The polymeric dispersant can be prepared by standard solution, suspension, or latex polymerization techniques using standard free radical initiators. Chain transfer agents can be used to control the molecular weight. The acrylic dispersant is prepared in the absence of water and with a minor amount of organic solvent at levels of about 0.02 to 0.2 weight ratio of organic solvent to polymeric solids at 100° C. to 175° C. If solvents are used, glycol ether solvents such as butyl cellosolve and hexyl cellosolve are preferred. Suitable initiators include all the common peroxides, hydroperoxides, and peresters, such as benzoyl peroxide, dicumyl peroxide, t-butyl perbenzoate, and t-butyl hydroperoxide. Initiators are used at levels of about 1% to 10% based on acrylic monomers used.

Referring next to the low molecular weight polyester oligomers dispersed into water with the low molecular weight addition copolymer dispersants in accordance with this invention, useful polyester oligomers comprise the esterification products of glycols, diols, or polyols with excess equivalents of dicarboxylic acid anhydrides or polycarboxylic acids, where the polyester oligomers are unsaturated polyesters containing ethylenic unsaturation. Linear aliphatic glycols are esterified with greater molar amounts of aromatic dicarboxylic acid and/or linear dicarboxylic acid having between 2 and 36 linear carbon atoms such as adipic, azelaic, succinic, glutaric, pimelic, suberic or sebacic acid, as well as unsaturated dicarboxylic acids such as maleic, fumaric or itaconic acid to produce low molecular weight, unsaturated polyesters. Although not preferred, minor amounts of monocarboxylic unsaturated acid such as acrylic, methacrylic or ethacrylic acid can be esterified. Preferred and commercially available linear saturated dicarboxylic acids are dodecanedioic acid, dimer fatty acids, or azelaic acid, while preferred unsaturated acid are maleic and fumaric. Aromatic dicarboxylic acids (anhydrides) include phthalic, isophthalic, terephthalic, and tetrahydrophthalic. Minor amounts of polyfunctional acids such as trimelletic acids can be added. Suitable glycols include linear aliphatic glycols having 2 to 16 carbon atoms such as 1,3- or 1,4-butylene glycol, 1,6-hexane diol, neopentyl glycol, propylene glycol, ethylene glycol and diethylene glycol, propylene and dipropylene glycol, and similar linear glycols. Preferred glycols are hydrophobic glycols such as hydrogenated Bisphenol A neopentyl glycol and 1,6-hexane diol. Minor amounts of polyols can be used such as glycerol, pentaerythritol, dipentaerythritol, or trimethylol ethane or propane, if desired. The equivalent excess of aromatic and linear saturated dicarboxylic acid over glycol equivalents is between about 1% and 30% and preferably between about 4% and 20%. The polyester contains excess unreacted carboxylic groups to provide a carboxylic acid functional polyester having an Acid No. between 20 and 200 and preferably between 30 and 100 milligrams of KOH per gram of polyester. The number average molecular weight of useful polyester oligomer polymers are between 600 and 5,000 and preferably between 1,000 and 3,000.

In a preferred aspect of this invention, low molecular weight carboxyl functional polyester oligomer having a number average molecular weight between about 1,000 and 3,000 is utilized as a processing polymerization medium for copolymerizing the ethylenic monomers to form the addition copolymer dispersant. In this regard, the polyester oligomer can replace all or most of the organic solvent as the polymerization medium for ethylenic monomer copolymerization thereby eliminating volatile organic compounds from the resulting polymeric binder as well as the coating composition. In accordance with this aspect of the invention, the carboxyl functional addition copolymer is prepared in the polyester oligomer medium to produce a mixture of carboxyl functional addition copolymer dispersant and carboxyl functional polyester oligomer. The mixture of carboxyl functional copolymer dispersant and carboxyl functional polyester oligomer can be dispersed into water by neutralizing at least part of the collective carboxyl functionality with an organic or inorganic base where the preferred bases are tertiary amines and the most preferred is ammonia. The mixture of carboxyl functional polymers are dispersed into water to provide an aqueous dispersion of addition polymer dispersant.

Acid functional polyester oligomers can be prepared by esterification of dicarboxylic acid groups with dihydroxyl compounds. Useful glycols include for instance ethylene glycol, propylene glycol, butanediols, diethylene glycol, dipropylene glycol, triethylene glycol, hexane diol, and similar glycols. Preferred glycols such as propylene, butylene, diethylene glycol and the like can be reacted with diacids such as maleic, adipic, isophthalic acid and the like at an excess of acid to hydroxyl functionality, to produce the carboxylic acid functional polyester with sufficient carboxyl groups to allow dispersion into water. The preferred acids are any aromatic diacid including o-, m-, and p-benzene dicarboxylic acid; any aliphatic diacids including succinic, maleic, fumaric, adipic, azeleic, sebacic, cyclohexane dicarboxylic, dodecane-di-oic, and dimerized fatty acids; and any poly functional carboxylic acids including trimelletic acid. The preferred diols are any materials containing two hydroxyl groups including ethylene glycol, diethylene glycol, polyethylene glycol, propylene glycol, dipropylene glycol, polypropylene glycol, butane diol, hexane diol, and neopentyl glycol. The preferred polyols are glycerol, mannitol, sorbitol, trimethylol propane, trimethylol ethane, and pentaerythritol. The polyester can be linear or branched, and can have an acid number (AN) from 20 to 200. The polyester oligomers can contain unsaturated diacids (fumaric and maleic are preferred), as the unsaturation provides grafting functionality for ethylenic monomer if desired. The polyester component can be synthesized by bulk polymerization, where the raw materials are charged in bulk and esterified at temperatures typically between 170° C. to 240° C., although moderately higher or lower temperatures can be utilized satisfactorily. An esterification catalyst can be used, typically an organic tin compound at less than 1% levels based on weight of the charge.

The invention is based on the preparation of a dispersion in water containing addition polymer dispersant to assist dispersion of the polyester oligomer into water. The carboxyl functional polyester and carboxyl functional polymeric dispersant are stirred and heated to form a mixture and until a solution or fine slurry is formed. A solution of a base in water is added to the mixture to neutralize the carboxylic acid groups and prepare a solution-like mixture, which is then diluted to less than about 50% NV with additional water. The epoxy resin is added and the mixture is heated until the epoxy groups have reacted with carboxyl groups to form stably dispersed crosslinked microgel particles. The base used to neutralize the carboxylic acid groups in preparing the emulsion can be any organic or inorganic base or combination of bases, with the preferred bases being ammonia and tertiary amines.

Referring next to epoxy resins, useful epoxy resins for crosslinking carboxyl polymers are predominantly linear chain difunctional epoxy resins. Useful epoxide functional resin comprise conventional bisphenol epoxy resins, glycidyl functional resins, epoxy novalac resins, and alkylene oxide resins. Bisphenol epoxies are preferred and are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'- dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin is reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups. Commercially available and useful lower molecular weight epoxy resins having a number average molecular weight between about 100 and 2,000 include Dow Chemical epoxy resins identified by trade number and average molecular weights as follows: DER 333 (380); DER 661 (525); while Shell Chemical epoxy resins are EPON 828 (380); EPON 836 (625); EPON 1001 (525); EPON 1007 F (4000); and Ciba-Geigy linear epoxy resins GT-7013 (1400); GT-7014 (1500); GT 7074 (2000); and GT-259 (1200). Particularly preferred lower molecular weight epoxy materials include EPON 828, EPON 1001, DER 333, and DER 661 having a number average molecular weight less than 1,000 and preferably between 300 and 500, measured by gel permeation chromatography (GPC) according to ASTM methods such as D3536-76, D3593-80, or D3016-78. Preferred epoxy resins have an epoxide equivalent weight between 100 and 1,000, and preferably between 180 and 500. High equivalent weight epoxy resins form a viscous melt when combined with acid functional polyester oligomers causing mixing problems, although epoxy blends containing minor amounts of high molecular weight epoxy resins are workable.

Useful epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while suitable number average molecular weight range of alkylene oxide resins is between 200 and 1,000 as measured by GPC. The post-added epoxy resin contains at least two epoxy groups per molecule and the preferred epoxy is bisphenol-A diglycidylether. The preferred catalysts are any tertiary amine or phosphine.

The relative amounts of polymeric dispersant, polyester, and epoxy are as follows. The polymeric dispersant can be used from 2% to 95% with a preferred level of 2% to 23%. The polyester can be from 1% to 97% with the preferred range being 75% to 96%. The balance is the crosslinking epoxy resin which can be from 1 to 50% with the preferred range being 2 to 20%. The resulting crosslinked microgel particles are less than about 0.2 microns, desirably less than 0.15 microns, and preferably less than 0.1 micron. The microgel polymer should have an Acid No. between about 20 and 100 and preferably between about 30 and 60.

In accordance with a further aspect of this invention, the aqueous blends of addition polymer dispersant and carboxyl functional low molecular weight polyester can be further blended with ethylenically unsaturated monomers for in-situ emulsion copolymerization of the monomers in the presence of the polymeric dispersant and polyester. The resulting high molecular weight in situ formed copolymers and grafted polyester produced during in situ copolymerization of the ethylenic monomers are advantageously stabilized in the aqueous medium by the low molecular weight polymeric dispersant. This aspect of the invention allows for the preparation of low VOC vinyl grafted polyester dispersions using techniques similar to latex polymerization. In practice, the polyester, the polymeric dispersant, and the ethylenic monomers are stirred to form a solution of fine slurry and then ammonia and water are added to form an emulsion. An acid functional polyester, vinyl dispersant, and vinyl monomers are stirred and heated until a solution of fine slurry is formed a solution. A solution of a base in water is added to neutralize the carboxylic acid groups and prepare an emulsion. The emulsion is diluted to less than 50% NV with additional water whereupon free radical initiator is added to polymerize the ethylenic monomers. The resulting dispersion can be reacted with and crosslinked by an epoxy resin by post-blending the epoxy resin with the dispersion and holding at an elevated temperature with or without assistance of a catalyst. The final particle size of the dispersion is typically less than 0.15 microns. Particle size is controlled by the composition, molecular weight, concentration, temperature, ionic strength, and the relative amounts of polymeric dispersant, polyester, and vinyl monomers, but is not controlled by mechanical shearing as in suspension polymerization. However, the particle size and distribution are similar to a latex, easier to control, and more reproducible than suspension techniques. Using this new technique, surprisingly small particle size (less than 0.15 micron) latices can be prepared without additional surfactants.

Copolymerizable ethylenically unsaturated monomers useful in forming the in situ emulsion copolymer and in situ grafting of the polyester are monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxy propyl acrylates and methacrylates, as well as amino acrylates and methacrylates. Carboxylic acid functional monomers can be included if desired. Carboxylic acid monomer include acrylic and methacrylic acids. Acrylic acids include acrylic and methacrylic acid, ethacrylic acid, alpha-chloracrylic acids, alpha-cyanoacrylic acid, crotonic acid, and beta-acryloxy propionic acid. Ethylenic monomer mixtures of acrylic and/or methacrylic esters with styrene are preferred. Styrene copolymerized very efficiently with the double bond unsaturation in the epoxy-ester. The preferred ethylenic monomers comprise acrylates, methacrylates, and styrenics, particularly ethylacrylate, butylacrylate, methylmethacrylate and styrene. Di- and multifunctional monomers can be used with the preferred being divinylbenzene or any di- or tri- acrylate or methacrylate. On a weight basis of total ethylenic monomers, the ethylenic monomers preferably comprise between 0% and 100% styrene monomers, and preferably between 20% and 80% styrene monomer, with the balance being other ethylenic monomers.

In accordance with this aspect of the invention, the carboxyl functional polymers are easily dispersed into water by simple mixing with water containing ammonia sufficient to neutralize a substantial portion of the acid groups available in the epoxy ester microgel. About 0.5 to 5% by weight ammonia as $NH_3$ on polymeric solids is typical while aqueous dispersion pH's close to 7 are preferred to eliminate the possibility of polyester hydrolysis. Polymerization of the ethylenic monomers can be initiated with any of the common free radical initiators, such as the peroxides, persulfates, peresters, and the azo initiators. Peroxide and perester redox initiation is preferred with systems such as Na formaldehyde sulfoxylate/Fe/persulfate, and ascorbic acid/Fe/t-butyl perbenzoate. The redox initiator pair ordinarily consists of an oxidizing agent and a reducing agent, where the preferred initiator is a redox pair. The preferred oxidizing agent is t-butyl hydroperoxide (t-BHP) while preferred reducing agents are ascorbic acid, isoascorbic acid, and SSF.

The relative amounts of addition polymer dispersant, polyester, and in-situ copolymerized monomers are as follows. The polymeric dispersant can be between 2% and 94% with the preferred level from 14% to 89%. The polyester can be from 4% to 96% with the preferred range being 5% to 80%. The grafting copolymer of in-situ copolymerized monomers can be from 1% to 60% with the preferred range being 1% to 40%. Post added epoxy for crosslinking and forming aqueous dispersed microgels can be from 1% to 50% with the preferred level being between 5% and 35%. Grafting copolymer of in-situ copolymerized monomers can be 0% to 60% and preferably 20% to 40%, where in all instances the relative weight are based on the total overall mixture of dispersant, addition copolymer grafted polyester, and epoxy crosslinker. The Acid No. of the resulting crosslinked microgel dispersed in water is between 20 and 100 and preferably between 30 and 60.

In accordance with the process of this aspect of the invention, stabilized aqueous dispersed, high molecular weight, crosslinked microgels are produced by preparing stabilized blends of carboxylic acid terminated polymeric dispersant and polyester polymers where unsaturated polyester is grafted with a free radical polymerized polymer (e.g., ethylenic monomer) in aqueous dispersion. The resulting microgel dispersions are stabilized by the low molecular weight, carboxylic acid functional polymeric dispersants in accordance with this invention. The crosslinking epoxy can be added before or after the in-situ grafting monomers are coreacted with the unsaturated polyester. Preferably the crosslinking epoxy is added after in-situ grafting of the unsaturated polyester. The resulting microgel dispersions can be thickened by post addition and reaction of polyfunctional epoxy resins, if desired. The microgel dispersions have particle sizes under 0.2 micron, preferably less than 0.1 micron, and are particularly useful as coatings for containers. The resulting epoxy crosslinked copolymers comprise very small micro-dispersion, crosslinked microgel polymer particles. The microgel particles produced by ethylenic monomer grafting of the water dispersed, linear unsaturated polyester subsequently crosslinked by difunction epoxy surprisingly provides highly crosslinked copolymers in the form of a stable aqueous microdispersion of extraordinary small internally crosslinked microgel polymer particles below about 0.2 micron without the need for and particularly without external surfactants. Excellent protective film formations on substrates are achieve without surfactants even though the microgel particles are internally highly crosslinked. Aqueous dispersions of these blended resins can be prepared in water with ammonia neutralization without the use of any volatile solvent. Hence, high quality coatings for interior beverage cans can be produced with acrylic crosslinked epoxy crosslinked microgel polymeric particles. Cured films exhibit excellent water resistance, and good clarity and gloss.

The merits of this invention are further illustrated upon referring to the following illustrative examples. Molecular weights are number average molecular weights measured by gel permeation chromatography (GPC).

EXAMPLE 1

Preparation of Carboxyl Functional Unsaturated Polyester

A 5-1 flask was equipped with an overhead stirrer, $N_2$ inlet, thermometer, and a packed distillation column with head. The kettle was charged with 1242.1 gms of propylene glycol, 345.1 gms of fumaric acid, 1211.4 gms of terephthalic acid, and 1.0 gm of butylstannoic acid. The slurry was stirred and warmed to about 165° C. with continuous stirring and nitrogen sparging. Water is removed at a head temperature of 98° C. to 100° C., while the pot temperature gradually climbs to 220° C. over several hours. When 360 mls of water had been removed, the slurry became a clear solution. The reaction was cooled to 180° C., then 1211.4 gms. of isophthalic acid was added to the pot. The new slurry was heated and additional water was removed. The reaction temperature is allowed to rise to, but not exceed 225° C. After 450 mls of water is removed, the packed column was replaced with a Vigreux column and additional water was removed to bring the total volume of water to 520 mls. The column was then replaced with a Dean-Stark trap, and water was removed. When the AN was 70, the reaction was cooled to 170° C. At 170° C., the reactor was opened and the product was poured into a storage container. The polyester solidifies upon cooling to rt.

EXAMPLE 2

Preparation of Carboxyl Functional Acrylic Polymeric Dispersant

A 2-1 flask was equipped with a reflux condenser, overhead stirrer, $N_2$ inlet, thermometer and an addition port. The flask was charged with 160 gms of ethyleneglycol monohexyl ether and warmed to 125° C. with stirring under a nitrogen blanket. A separate vessel was charged with 200 gms of MAA, 600 gms of EA, and 40 gms of 80% benzoyl peroxide and stirred to form a homogeneous solution. This solution was gradually added to the reaction flask, maintaining the temperature at 125° C., over three hours. When the addition was complete, 3.2 gms of t-benzyl perbenzoate was added and the reaction was held at 125° C. an additional hour.

EXAMPLE 3

Preparation of Polyester/Acrylic Aqueous Dispersion

A one liter flask was equipped with an overhead stirrer, $N_3$ inlet and thermometer. The flask was charged with 60 gms of polyester from Example 1, 48 gms of polymeric dispersant from Example 2, 13.5 gms of styrene, 45 gms of BA, and 1.5 gms of divinyl benzene. The mixture was then heated, under air atmosphere, to 90° C. and stirred for about 25 minutes until a fine slurry was formed. A mixture of 12 gms of ammonia (28% in water) and 28 gms of water was added via dropping funnel over about five minutes and the reaction temperature was allowed to drop. A $N_2$ blanket was begun an additional 424.5 gms of water was added over about 20 minutes to dilute the emulsion allowing the temperature to drop further. The temperature was held at 50° C. A solution of 0.1% FE(II)/EDTA (1.5 gms) was added. The initiator solutions were prepared by dissolving 0.4 gms of SSF (identify) into 1.6 gms of water. A separate solution of 0.3 gms of 70% tBHP in 1.7 gms of water was prepared. These initiator solutions were added to the reaction vessel and the reaction exothermed to 63° C. over about 10 minutes. When the reaction cooled to 50° C., two chaser solutions (0.1 gm SSF in 0.9 water and 0.075 tBHP in .925 water) were added, and the reaction was held at 50° for 30 minutes. The reaction was then cooled to 30° C. and filtered into storage vessel. There was no grit. The pH was 7.7 and the Ford cup viscosity was 15 seconds. The particle size was less than 100 nm. The NV was 25%.

EXAMPLE 4

Preparation of Crosslinked Microgel 100 gms of the aqueous dispersion prepared in Example 3 was blended with 3.0 gms of bisphenol-A diglycidylether, 9 gms of water, and 1 drop of dimethylethanolamine. The mixture was shaken vigorously for 20 seconds, then placed in an oven at 50° C. for 17 hours. The pH of the resulting dispersion was 8.7, and the Ford Cup viscosity was 74 seconds. The NV was 25%.

This resin, when applied as a thin film to aluminum panels and air dried, exhibited an excellent water blush, Joy blush, and wedgebend flexibility.

EXAMPLE 5

In a manner similar to Examples 1-4, microgel particles for use as a polymeric binder in protective coatings was prepared as follows:

A. Preparation of acrylic dispersant

Prepare a methacrylic acid polymer as follows: Combine 1.0 g $(NH_4)_2S_2O_8$, 4.0 g ethylacrylate, 96 g methacrylic acid, and 1850 g deionized water and warm under nitrogen to 40° C. Pump in 0.80 g ascorbic acid in 50 ml of water over 1.5 hours, hold 0.5 hour, cool.

B. Preparation of unsaturated polyester.

Prepare a polyester from the following:

360.4 g 1,3-butyleneglycol 249.3 g terephthalic acid 249.3 g isophthalic acid 10.0 g fumaric acid 73.1 g adipic acid 0.5 g butylstanoic acid Heat the glycol with the iso- and terephalic acids to 230 under nitrogen with good stirring and a packed column (keep head temperature at 98° C.), and cook until the mixture is clear. And the other ingredients and cook to low acid number with xylene azeotrophe (ca. 10 mg KOH/g resin).

C. Preparation of aqueous suspension a)

600 g water 2.0 g ascorbic acid 200 g acrylic dispersant part A b)

50 g polyester of part B 20 g butylacrylate 80 g styrene c)

1.0 ml 1000 ppm $FeSO_4$ solution d)

2.5 g $(NH_4)_2S_2O_8$ 25 g water e)

5.0 g $NH_3$, 28% aqueous 10 g water

Disperse (b) into (a) with a Homomixer for 1 minute, and then pass through a Sonics ultrasound device at 85% power. Warm to 40° C. under nitrogen, add (c), and then pump in (d) over 2 hours. Add (e) over 5 minutes, cool. To this mixture, add a mixture of 950 g water with 47.5 g methacrylic acid, 2.5 g ethylacrylate, and 0.5 g t-butylhydroperoxide. Under nitrogen at 50° C., a mixture of 0.5 g ascorbic acid in 25 g water was added over 2 hours.

D. Preparation of epoxy crosslinked microgel a)

103 g resulting solution of composition part C.

497 g water b)

50 g Epon 1007F, Shell epoxy 60 g styrene 40 g ethylacrylate c)

0.5 g ascorbic acid 25 g water d)

7.0 g $NH_3$, 29% aqueous 18 g water

Prepare suspension and polymerize as in part C above. A film prepared from the resulting composition was baked 5 minutes at 350° F. The film was smooth and lightly hazed, with no blush noted. After a 1 hour wait, the film was soaked at 180° F., but did not exhibit any film deterioration.

We claim:

1. An aqueous dispersed, protective coating composition substantially free of volatile organic compounds, the coating containing a film-forming polymeric binder dispersed into water, the polymeric binder comprising on a weight basis:

(a) between 2% and 95% of a preformed, carboxyl functional, addition copolymer dispersant of non-aqueous copolymerized ethylenically unsaturated monomer, the monomers containing at least 5% by weight carboxylic acid monomer, where the addition copolymer has an Acid No. above 35 and a number average molecular weight between 1,000 and 50,000;

(b) between 1% and 97% of a low molecular weight, carboxyl functional polyester oligomer having an Acid No. between 20 and 200 and a number average molecular weight between about 600 and 5,000;

(c) between 1% and 50% of a low molecular weight epoxy resin having an epoxide equivalent weight between about 100 and 1,000; and where the polymeric binder is an epoxy crosslinked microgel copolymer produced by the addition copolymer dispersant and the polyester being dispersed into an aqueous medium to form an aqueous resin mixture, dispersing epoxy resin into the aqueous resin mixture, and crosslinking the epoxy resin with the carboxyl functionality on the addition copolymer dispersant and carboxyl functionality on the polyester to produce aqueous dispersed epoxy crosslinked microgel polymer particles having a particle size less than about 0.2 microns, where the epoxy crosslinked microgel polymer has an Acid No. between about 20 and 100, and the microgel polymer particles are stably dispersed into water free of surfactant.

2. The coating composition of claim 1 where the polymeric binder comprises by weight between 2% and 23% addition copolymer dispersant, between 75% and 96% polyester oligomer, and between 2% and 20% epoxy resin.

3. The coating composition of claim 1 where the microgel polymer particles are less than about 0.15 microns.

4. The coating composition of claim 1 where the addition copolymer dispersant comprises by weight between 10% and 50% copolymerized acrylic acid or methacrylic acid to provide a copolymer Acid No. between 90 and 280.

5. The coating composition of claim 1 where the addition copolymer dispersant has a molecular weight between 1,000 and 20,000.

6. The coating composition of claim 1 where the polyester oligomer has an Acid No. between about 30 and 100.

7. The coating composition of claim 1 where the polyester oligomer has a molecular weight between 1,000 and 3,000.

8. The coating composition of claim 1 where the polyester oligomer comprises between 4% and 30% excess equivalents of dicarboxylic acid esterified with lesser equivalents of glycol.

9. The coating composition of claim 1 where the epoxy resin has a number average molecular weight between 200 and 4,000.

10. The coating composition of claim 1 where the epoxide equivalent weight is between 180 and 500.

11. The coating composition of claim 1 where the polyester oligomer is an unsaturated polyester.

12. The coating composition of claim 11 where the epoxy crosslinked microgel copolymer is a graft copolymer containing grafted copolymerized ethylenically unsaturated monomers.

13. The coating composition of claim 1 where the microgel graft copolymer is produced by in-situ emulsion copolymerizing the ethylenically unsaturated monomer in the presence of the aqueous dispersed polyester oligomer followed by epoxy resin crosslinking of the carboxyl functionality to produce the microgel graft copolymer particles.

14. The coating composition of claim 12 where the graft microgel graft copolymer is produced by in-situ emulsion copolymerizing the ethylenically unsaturated monomer after the step of epoxy resin crosslinking the carboxyl functionality to produce grafted crosslinked microgel polymer particles.

15. The coating composition of claim 12 where the epoxy crosslinked microgel graft copolymer comprises by weight between:

2% and 94% addition copolymer dispersant;

4% and 96% polyester oligomer;

1% and 50% epoxy resin; and

1% and 60% grafted polymer of copolymerized monomer.

16. The coating composition of claim 12 where the epoxy crosslinked microgel graft copolymer comprises by weight between:

14% and 89% addition copolymer dispersant;

5% and 80% polyester oligomer;

5% and 35% epoxy resin; and

1% and 40% grafted polymer of copolymerized monomer.

17. A process for producing an aqueous dispersed protective coating composition containing a film-forming polymeric binder stably dispersed into water, the polymeric binder produced by the steps comprising:

forming an aqueous dispersion of carboxyl functional addition copolymer dispersant of copolymerized ethylenically-unsaturated monomer where the copolymer dispersant has an Acid No. above 35 and a number average molecular weight between 1,000 and 50,000;

dispersing a carboxyl functional polyester oligomer and a diepoxide crosslinking agent into the preformed aqueous dispersion of addition copolymer dispersant, where the polyester oligomer has an Acid No. between 20 and 200 and a number average molecular weight between 600 and 5,000, and the diepoxide has an epoxide equivalent weight between about 100 and 1,000;

reacting the diepoxide with the carboxyl functionality of the addition copolymer dispersant and the polyester oligomer to produce epoxy crosslinked microgel polymer particles having a particle size less than about 0.2 microns.

18. The process of claim 17 where the polyester oligomer is an unsaturated polyester and is grafted by ethylenic monomers in-situ copolymerized to form grafted epoxy crosslinked microgel polymer particles.

19. The process of claim 18 where the in-situ copolymerization grafting step is before the step of the diepoxide reacting with and crosslinking the carboxyl functionality.

20. The process of claim 18 where the in-situ copolymerization grafting step is after the step of the diepoxide reacting and crosslinking the carboxyl functionality.

21. The process of claim 17 where the polyester oligomer is used as the polymerization medium for the formation of the carboxyl functional addition copolymer dispersant and the resulting mixture of polyester and oligomer are dispersed into water to form a dispersant dispersion followed by dispersing epoxy resin into the resulting aqueous dispersant dispersion.

22. A process for producing an aqueous dispersed protective coating composition containing a film-forming polymeric binder stably dispersed into water, the polymeric binder produced by the steps comprising:

forming an aqueous dispersion of carboxyl functional addition copolymer dispersant and carboxyl functional polyester oligomer, where the addition copolymer is non-aqueous copolymerized ethylenically unsaturated monomer and has an Acid No. above 35 and a number average molecular weight between 1,000 and 50,000, and the carboxyl functional polyester oligomer has an Acid No. between 20 and 200 and a number average molecular weight between 600 and 5,000;

dispersing a diepoxide crosslinking agent into the aqueous dispersion, where the diepoxide has an epoxide equivalent weight between about 100 and 1,000; and reacting the diepoxide with the carboxyl functionality of the addition copolymer dispersant and the carboxyl functionality of the polyester oligomer to produce aqueous dispersed epoxy crosslinked microgel polymer particles having a particle size less than about 0.2 microns.

23. The coating composition of claim 1 where the preformed, carboxyl functional, addition copolymer dispersant is produced by in situ copolymerizing the non-aqueous polymerized ethylenic monomers in the presence of the polyester oligomer to provide a non-aqueous mixture, followed by disbursing the non-aqueous mixture into water, and then dispersing the epoxy resin into the aqueous mixture for crosslinking with the preformed carboxyl functional addition copolymer.

* * * * *